Patented Sept. 28, 1948

2,450,176

UNITED STATES PATENT OFFICE 2,450,176

PREPARATION OF PALLADIUM OXIDE

Herbert E. Zschiegner, Ocean Grove, N. J., assignor to Emanuel Honig, Brooklyn, N. Y.

No Drawing. Application August 18, 1947,
Serial No. 769,327

2 Claims. (Cl. 252—472)

This invention relates to the preparation of palladium oxide in a form useful as a catalyst. The method is particularly useful for obtaining this compound from alloyed silver and palladium.

Silver and palladium are extracted from gold and palladium group metals during refinement of the latter, by dissolving them from such precious metals with aqueous nitric acid. This produces an aqueous solution of silver and palladium nitrates, and the present invention may be used for preparing catalytic palladium oxide from such a solution. This is commercially advantageous in many instances.

According to the invention, an aqueous solution of silver and palladium nitrates is evaporated to dryness. This solution may be obtained in connection with the refinement of precious metals as suggested above, or it may be produced only to practice the present invention as by dissolving silver and palladium in aqueous nitric acid. The corrosive nature of nitric acid should be kept in mind, it being suggested that the container in which the evaporation is carried out be made of platinum, tantalum, fused silica, stainless steel or one of the heat resistant glasses.

The dry residue obtained from the above evaporation step is heated to a temperature above the decomposition temperature of palladium nitrate and below the decomposition temperature of silver nitrate. Temperatures higher than 212° C. and lower than 440° C. are suitable for this purpose. At temperatures within this range the silver nitrate fuses and the palladium nitrate is decomposed to palladium oxide, it being understood that this heating step may be carried out with the crucible contents exposed to the atmosphere. As the temperatures described are maintained, the crucible contents will ultimately reach a state of quiescent fusion and the temperatures are maintained after this state is reached, for about 10 minutes. Then the heating is discontinued and the melt cooled so it freezes.

After the temperature of the melt reduces to about or below water-boiling temperature, water is added to it and stirred until the silver nitrate is dissolved in the water, the palladium oxide being insoluble in water and forming a suspension in it. Thereafter the palladium oxide is mechanically separated, as by filtration, and is washed with aqueous nitric acid preferably in dilute solution, until free from silver. Then the palladium oxide is dried and is ready for use as a catalyst in either supported or unsupported form.

The foregoing has been specifically practiced as follows:

Example I.—An aqueous solution containing about one gram of palladium and about nine grams of silver, both in the form of nitrates, was evaporated to dryness in a "Pyrex" (trade-mark) glass beaker. More heat was applied and the temperature gradually raised to about 220° C., and the heat was maintained at this temperature for about 10 minutes after an apparently quiet fusion was obtained. The fusion was cooled about or below the boiling temperature of water, and about 100 cc. of distilled water was added and heated to boiling. The resultant palladium oxide left as an insoluble mixture with the water, was filtered off after cooling enough for convenience, and washed with dilute aqueous nitric acid until the filtrate was substantially free of silver.

Example II.—About one gram of palladium and about nine grams of silver were melted together to form an alloy. This alloy was dissolved in about 20 cc. of aqueous nitric acid, and then palladium oxide was prepared therefrom in exactly the same manner as in Example I.

Example III.—Supported Catalyst: Palladium oxide was prepared in exactly the same manner as described under Example I up to the point of filtering off the palladium oxide. Instead of filtering the palladium oxide, it was washed with dilute aqueous nitric acid by decantation until substantially free from silver, and then it was washed with water. Thereafter about forty grams of silica gel was added to the aqueous suspension of palladium oxide left by retaining sufficient water for this purpose. The mass of palladium oxide, water and silica gel was then heated to evaporate off the water. The mass was stirred during the heating process to obtain a uniform distribution of the palladium oxide on the surface of the silica gel.

Example IV.—Supported Catalyst: Palladium oxide was prepared as in Example I except that about 10 grams of alumina were added to the mixed nitrates of silver and palladium before evaporation. In this manner the palladium oxide was deposited directly on the carrier as it was formed. Other carriers may be substituted for those employed in Examples III and IV.

The proportions given in the above examples are not critical and may be varied without departing from this invention. In all instances a satisfactory palladium oxide catalyst was produced. For some purposes the silver need not be washed away completely.

I claim:

1. A method of preparing palladium oxide on a refractory support, including mixing the support with an aqueous solution of palladium and silver nitrates, evaporating the water from the result and heating it to temperatures above the decomposition temperature of palladium nitrate and below the decomposition temperature of silver nitrate for a sufficient time to decompose a substantial portion of the palladium nitrate to palladium oxide and subjecting this result when cooled to the action of a solvent of the silver nitrate but not of the palladium oxide to dissolve the former from the latter and to leave a deposit of the palladium oxide on said support.

2. A method of preparing palladium oxide including the step of heating a mixture of palladium and silver nitrates to temperatures above that decomposing the palladium nitrate to palladium oxide and below that decomposing the silver nitrate for a sufficient time to decompose a substantial portion of the palladium nitrate, subjecting said mixture when cooled to the action of a solvent of the silver nitrate but not of the palladium oxide to dissolve the former from the latter and to leave a suspension of the palladium oxide in the solvent, immersing a support in said suspension, and driving off the solvent to deposit the palladium oxide on the support.

HERBERT E. ZSCHIEGNER.

REFERENCES CITED

The following references are of record in the file of this patent:

UNITED STATES PATENTS

| Number | Name | Date |
|---|---|---|
| 1,673,691 | Lilfenroth | June 18, 1928 |
| 1,779,841 | Fischer | Oct. 28, 1930 |
| 2,043,743 | Frary | June 9, 1936 |